Nov. 2, 1965   T. J. FINLEY ETAL   3,215,308
FOLDABLE FOOD AND BEVERAGE CARRIER
Filed April 24, 1964
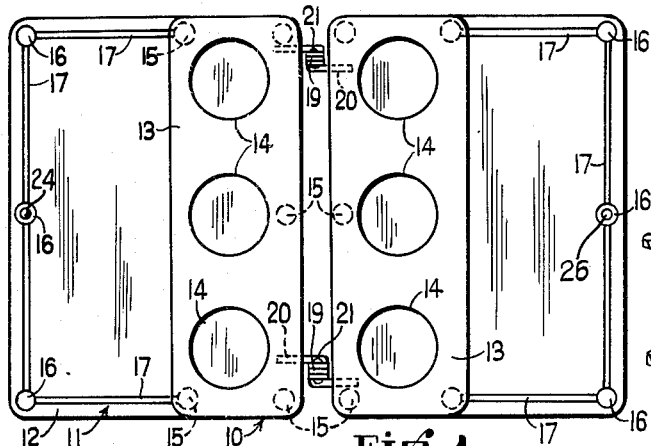
Fig. 1
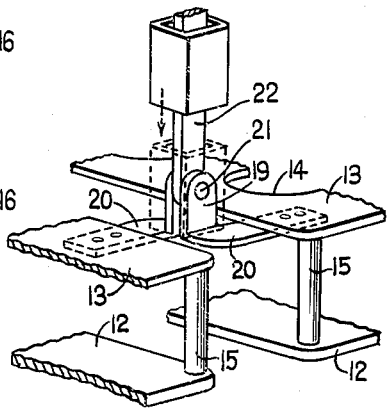
Fig. 3
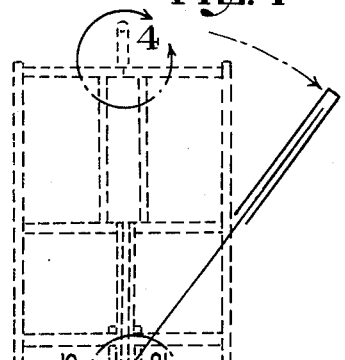
Fig. 2
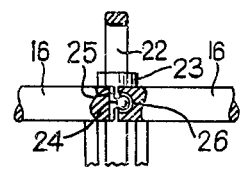
Fig. 4
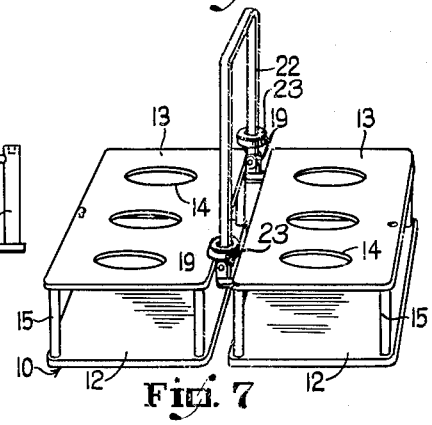
Fig. 7
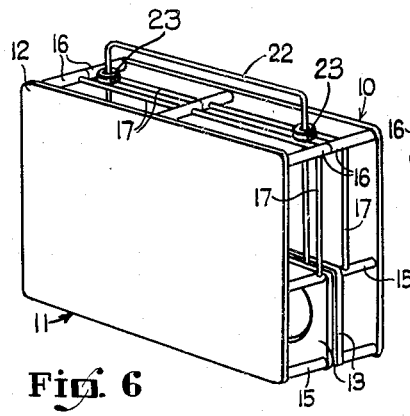
Fig. 6
Fig. 5
INVENTORS
T. J. Finley.
Gwen Finley.

United States Patent Office 3,215,308
Patented Nov. 2, 1965

3,215,308
FOLDABLE FOOD AND BEVERAGE CARRIER
T. J. Finley and Gwen Finley, both of
506 N. 9th, Haskell, Tex.
Filed Apr. 24, 1964, Ser. No. 362,383
4 Claims. (Cl. 220—111)

This invention relates to both food and beverages, and a carrier in which they may be transported from place to place.

One of the many pleasures enjoyed by people during warm weather is that of eating and drinking out of doors. This may be at picnics or while watching sporting events. Unfortunately, this pleasant pastime often becomes an annoyance if one should spill either the food or beverage upon himself or someone else.

It is therefore the principal object of this invention of ours to provide a food and beverage carrier that is specially designed and constructed to prevent the spilling of food and beverage while carrying the same from place to place or while providing a place of support during the normal process of consumption.

Another object of this invention of ours is to provide a food and beverage carrier that can be folded and carried by its handle like a lady's handbag even though the food and beverage is in the same.

Another object of this invention of ours is to provide a foldable food and beverage carrier than can be manufactured from any desired material such as plywood, light-weight metal, plastic or a combination of any two or three of these materials.

Another object of this invention of ours is to provide a foldable food and beverage carrier that can be made to hold any number of food and beverage containers in a way that will prevent them from spilling their contents while being carried from place to place.

Still another object of this invention is to provide a foldable food and beverage carrier that will act as a serving tray when opened up in a way that will prevent its contents from accidentally spilling on anyone.

With the above and other objects in view, the present invention consists in the combination and arrangements of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawing:

FIGURE 1 is a top view of this invention opened and ready for use.

FIGURE 2 is an end view of an optional form of this invention with solid lines showing it in an open position, and phantom lines showing it in a closed position.

FIGURE 3 is an enlarged detail of that part of this invention that is shown within the arrowed circle and indicated by the numeral 3 on FIGURE 2 of the drawing.

FIGURE 4 is an enlarged detail of this invention, shown within the arrowed circle and indicated by the numeral 4 on FIGURE 2 of the drawing.

FIGURE 5 is a perspective view of this invention in open position.

FIGURE 6 is a perspective view of this invention in a closed position, ready for carrying from place to place.

FIGURE 7 is a perspective view of an optional form of this invention.

Referring more specifically now to the drawing in which we have shown the preferred embodiment of our invention, the carrier 10 is made up of two rectangular containers 11 that are identical to one another, other than the fact that one is right hand and the other is left hand. Each container 11 embodies a flat bottom 12 and a cup- or bottle-holding plate 13 that is provided with a plurality of openings 14 for this purpose of holding a cup or bottle or any other vertically disposed beverage containers. The cup- or bottle-holding plate 13 is supported above and parallel to the aforesaid bottom 12 by means of a plurality of vertically disposed posts 15 that are connected to like posts 16 that project upward from the periphery of the aforesaid flat bottom 12 to which they, the posts, are secured by a plurality of rigid rods 17, as clearly shown in FIGURES 1 and 2 of the drawing.

A hinge member 19 is riveted or otherwise secured to each end of the aforesaid bottle-holding plate 13. The end 20 of each hinge member 19 is formed at right-angle thereto so that it slidably mates with the like member on the like one of the containers 11 which are connected together by the hinge pin 21 passing laterally through the end 20 of each hinge member 19 as clearly shown in FIGURES 1 and 3 of the drawing.

An inverted U-shaped handle 22 is suitably secured to this invention, preferably by its aforesaid hinge pins 21, as one can see by examining FIGURES 2, 3, 5, 6 and 7 of the drawing. The aforesaid handle 22 can obviously not only be used to carry this invention in its open position, but also in its closed position (FIGURES 2, 4, and 6). It is in the open position that the pair of rings 23 that are slidably located on the inverted U-shaped handle 22 are used to keep the handle in its desired vertical position by resting down over the hinge 19 and handle 22 where the handle 22 fastens to the hinge 19, as clearly shown in FIGURES 3, 4 and 7 of the drawing. This last mentioned view shows one ring on each side member of the handle.

It is now obvious from reading the above specification of this new and novel invention of ours, and upon examination of the drawing, that we have provided a foldable food and beverage carrier that needs no further explanation other than to remark once more that changes may be made in the form, size and proportion, and minor details of construction of the invention. An example of this is best provided in the aforesaid FIGURE 7 of the drawing where it is seen that in this optional form of construction the bottle-holding plate 13 is of the same area as is the flat bottom 12.

If containers of liquid placed in the openings 14 of the cup- or bottle-holding plate 13 should be of a depth slightly greater than the height of the post 15, and the top is tight on the container, then there will be no danger of its contents spilling out of the container when it is up on its side as will be necessary when the invention is folded for carrying as is illustrated in FIGURE 6 of the drawing. A suitable catch may be placed on this invention to securely hold the same in a folded position when so desired. One suggested form of catch is shown in FIGURE 4 where it is seen that it, the catch, consists of a ball-shaped member 24 held in place on the end 25 of one of the aforesaid posts 16 in order that it may snap into the recess 26 that is located in the opposite one of the aforesaid posts 16 when the invention is in a closed position.

What we now claim as our invention is:

1. A foldable food and beverage carrier of the character described, comprising two rectangular containers having a flat bottom and a cup- and bottle-holding plate in equal and parallel spaced relation above the said flat bottom to which it is secured by a plurality of vertically disposed posts, each said cup- and bottle-holding plate having a plurality of openings therein adapted to receive and hold a cup or bottle, and a plurality of vertically disposed and equally spaced posts extending around the periphery of the said rectangular container, the said posts being connected together by rods, and the two said containers being identical other than that one is right hand and one is left hand, the said containers being hinged together so as to permit their being folded together, and each one of the said containers being structurally adapted to hold both food and beverages therein, and an inverted U-shaped handle having the end thereof connected to the pins of the hinges.

2. A foldable food and beverage carrier of the character described, comprising two rectangular containers having a flat bottom and a cup- and bottle-holding plate in equal and parallel spaced relation above the said flat bottom to which it is secured by a plurality of vertically disposed posts, each said cup- and bottle-holding plate having a plurality of openings therein adapted to receive and hold a cup or bottle, and a plurality of vertically disposed and equally spaced posts extending around the periphery of the said rectangular container, the said posts being connected together by rods, and the two said containers being identical other than that one is right hand and one is left hand, the said containers being hinged together so as to permit their being folded together, and each one of the said containers being structurally adapted to hold both food and beverages therein, and an inverted U-shaped handle having the end thereof connected to the pins of the hinges and means of securing each of the said containers together when the invention is folded.

3. A foldable food and beverage carrier of the character described, comprising two rectangular containers having a flat bottom and a cup- and bottle-holding plate in equal and parallel spaced relation above the said flat bottom to which it is secured by a plurality of vertically disposed posts, each said cup- and bottle-holding plate having a plurality of openings therein adapted to receive and hold a cup or bottle, and a plurality of vertically disposed and equally spaced posts extending around the periphery of the said rectangular container, the said posts being connected together by rods, and the two said containers being identical, other than that one is right hand and one is left hand, the said containers being hinged together so as to permit their being folded together, and each one of the said containers being structurally adapted to hold both food and beverages therein, and an inverted U-shaped handle having the end thereof connected to the pins of the hinges and means of securing each of the said containers together when the invention is folded, and the said U-shaped handle having a ring slidably mounted on each side thereof to hold the said U-shaped handle in an upright position.

4. A foldable food and beverage carrier of the character described, comprising two rectangular containers having a flat bottom and a cup- and bottle-holding plate in equal and parallel spaced relation above the said flat bottom to which it is secured by a plurality of vertically disposed posts, each said cup- and bottle-holding plate having a plurality of openings therein adapted to receive and hold a cup or bottle, and a plurality of vertically disposed and equally spaced posts extending around the periphery of the said rectangular container, the said posts being connected together by rods, and the two said containers being identical, other than that one is right hand and one is left hand, the said containers being hinged together so as to permit their being folded together, and each one of the said containers being structurally adapted to hold both food and beverages therein, and an inverted U-shaped handle having the end thereof connected to the pins of the hinges and a catch embodying a ball-shaped member that is mounted on the outer end of structure of the said foldable food and beverage carrier in a way that will permit the engagement of the said ball-shaped member in the ball-shaped recess directly opposite the said ball-shaped member when the said food and beverage carrier is in folded position in which it is kept by the said catch, and the said U-shaped handle having a ring slidably mounted on each side thereof to hold the said U-shaped handle in an upright position.

References Cited by the Examiner
UNITED STATES PATENTS

| | | | |
|---|---|---|---|
| 532,324 | 1/95 | Kolb | 220—110 |
| 1,770,927 | 7/30 | Ipsen | 220—104 |
| 2,508,062 | 5/50 | Fowler | 220—101 |
| 2,522,080 | 9/50 | Wyatt | 220—110 |
| 2,531,092 | 11/50 | Waller | 220—101 |
| 2,612,602 | 11/52 | Middlestadt | 220—101 |

JOSEPH R. LECLAIR, *Primary Examiner.*

GEORGE O. RALSTON, *Examiner.*